United States Patent
Wada et al.

(10) Patent No.: US 6,619,074 B1
(45) Date of Patent: Sep. 16, 2003

(54) APPARATUS AND METHOD FOR PRODUCTION OF A POROUS OPTICAL FIBER PREFORM

(75) Inventors: Hiroyuki Wada, Mie (JP); Toshihiro Mikami, Tochigi (JP); Akihiro Kanao, Chiba (JP); Yukio Kohmura, Aichi (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 341 days.

(21) Appl. No.: 09/649,576

(22) Filed: Aug. 29, 2000

(51) Int. Cl.[7] ............................................. C03B 37/018
(52) U.S. Cl. .............................. 65/414; 65/413; 65/421; 65/379; 65/27
(58) Field of Search .......................... 65/413, 414, 421, 65/379, 27

(56) References Cited

U.S. PATENT DOCUMENTS 6,012,305 A  *  1/2000  Kuwabara et al. ............ 65/413

FOREIGN PATENT DOCUMENTS

| JP | 1-242431 | 9/1989 | |
|----|----------|--------|----|
| JP | 2-283632 | 11/1990 | |
| JP | 5-306136 | * 11/1993 | .................. 65/414 |

* cited by examiner

Primary Examiner—Michael Colaianni
(74) Attorney, Agent, or Firm—Oblon, Spivak, McClelland, Maier & Neustadt, P.C.

(57) ABSTRACT

An apparatus for the production of a porous optical fiber preform preventing cracks in the preform and stabilizing quality over the longitudinal direction. The apparatus includes a reaction portion, a feed port for introducing a stream of gas, and a main exhaust port. A rotating mechanism is provided for mounting, rotating, and pulling up a seed rod for forming the porous optical fiber preform. A first burner emits a flame carrying fine particles of glass forming the core portion, and a second burner emits a flame carrying fine particles of glass forming the cladding portion. A portion adjusts the flow of the stream from the feed port to the main exhaust port so that the flames carrying the glass particles are not disturbed by the stream and so that the stream does not directly contact a fine glass particle deposit formed at a bottom end of the seed rod.

12 Claims, 5 Drawing Sheets

6,619,074 B1

APPARATUS AND METHOD FOR PRODUCTION OF A POROUS OPTICAL FIBER PREFORM

BACKGROUND OF THE INVENTION

1. Field of the Invention

The present invention relates to an apparatus and method for production of a porous optical fiber preform, more particularly relates to an apparatus and method for production of a porous optical fiber preform for preventing cracking and maintaining a uniform quality of the porous optical fiber preform when producing a porous optical fiber preform by the VAD method.

2. Description of the Related Art

Optical fibers are being used in various fields such as optical communications. Optical fibers are, briefly, produced by the following method. First, a porous optical fiber preform is formed. Next, the porous optical fiber preform is heated and vitrified. Then, the vitrified optical fiber preform is heated and drawn to form a single mode optical fiber comprised of for example a core of a diameter of 10 $\mu$m and a cladding of a diameter of 125 $\mu$m formed at the circumference of the core. The thus formed optical fiber is then covered by a resin.

The VAD method is mainly used for producing the porous optical fiber preform used for producing the optical fiber in this way. A porous optical fiber preform is produced by the VAD method as shown, for example, in FIG. 1 illustrating the interior of a reaction vessel 11, by charging silicon tetrachloride ($SiCl_4$) gas into oxyhydrogen flames 3 emitted using a core forming multitube burner 1 and a cladding forming multitube burner 2 arranged in a reaction portion 11C of the reaction vessel 11 so as to generate fine particles of glass, that is, silicon dioxide ($SiO_2$), by a flame hydrolysis reaction, making the fine particles of glass deposit on a rotating seed rod 4, and thereby form a fine glass particle deposit 5 around the seed rod 4. The rotating seed rod 4 is pulled up so that the fine glass particle deposit 5 is formed in its longitudinal direction and thereby obtain a porous optical fiber preform. At this time, if charging a small amount of fine particles of germanium chloride ($GeCl_2$) etc. into the core forming multitube burner 1 along with the silicon tetrachloride as a dopant for raising the refractive index of the core portion from the cladding portion, fine particles of germanium oxide ($GeO_2$) etc. are simultaneously produced and a spread of germanium dioxide can be created in the radial direction of the fine glass particle deposit 5. Note that reference numeral 10 shows a feed port, 13 a main exhaust port, and 12 a secondary exhaust port.

In the above method, the fine particles of glass are deposited on the seed rod 4 in a horizontal stream of gas 6 from the burner 1 and 2 side to the secondary exhaust port 12 side while rotating and pulling up the seed rod 4. The not deposited excess fine particles of glass are carried by the horizontal stream of gas 6 introduced from the feed port 10 through the reaction portion 11C to the main exhaust port 13 where they are exhausted to the outside of the reaction vessel 11. By exhausting the excess fine particles of glass not deposited on the seed rod 4 in this way, it is possible to prevent the excess fine particles of glass not deposited on the seed rod 4 from depositing on the reaction vessel 11 and then peeling off from the reaction vessel 11 and depositing on the surface of the fine glass particle deposit 5 and thereby causing bubbles in the fine glass particle deposit 5 after vitrification.

As the horizontal stream of gas 6, air or an inert gas such as argon gas is used. The horizontal stream of gas 6 is usually introduced in an ordinary temperature state.

When forming a fine glass particle deposit by the VAD method, however, the soot growth rate, that is, the distance by which the seed rod (deposit of fine particles of glass) is pulled up per unit time, must be made constant in order to prevent fluctuations in the cutoff wavelength, to obtain a uniform shape of the fine glass particle deposit, etc. That is, if the flames can be kept steady without flickering, the rate of growth of the fine glass particle deposit becomes stable and the distribution of the dopant for raising the refractive index of the core portion, for example, the germanium, in the longitudinal direction of the fine glass particle deposit becomes constant so the final optical fiber ends up with less variations in characteristics.

In practice, however, disturbances in the flow of gas in the reaction vessel make the flames flicker and therefore it is difficult to make the growth rate in the longitudinal direction of the fine glass particle deposit constant. Therefore, various measures have been devised to prevent flickering of the flames.

As one example, to prevent the flow of horizontal stream of gas 6 from being disturbed at the portion where the fine glass particle deposit 5 is formed on the seed rod 4, the method has been proposed of stabilizing the flow of the horizontal stream of gas 6 by making the horizontal stream of gas 6 forcibly flow by a blower (see Japanese Unexamined Patent Publication (Kokai) No. 1-242431).

As another example, the method has been proposed of providing a baffle plate surrounding the main exhaust port 13 so that the horizontal stream of gas is exhausted smoothly from the main exhaust port 13 (see Japanese Unexamined Patent Publication (Kokai) No. 2-2836321).

These methods however have had the following problems.

The first problem is that the horizontal stream of gas 6 strikes the fine glass particle deposit while it is being formed. The horizontal stream of gas 6 introduced at an ordinary temperature causes the surface temperature of the fine glass particle deposit 5 to fall, so the density of the fine glass particle deposit 5 falls and cracks form In the fine glass particle deposit 5.

The second problem is that the horizontal stream of gas 6 strikes the flames of the burners 1 and 2. The flames of the burners 1 and 2 are made to flicker and therefore the quality of the fine glass particle deposit 5 being formed, in other words the quality of the porous optical fiber preform, fluctuates in the longitudinal direction.

SUMMARY OF THE INVENTION

An object of the present invention is to provide an apparatus for the production of a porous optical fiber preform which prevents the horizontal stream of gas from the feed port to the main exhaust port from disturbing the shapes of the flames carrying fine particles of glass and prevents it from contacting the portion where the fine glass particle deposit is being formed.

Another object of the present invention is to provide an apparatus for the production of a porous optical fiber preform which prevents the surface temperature of the fine glass particle deposit from falling and thereby prevents cracks in the fine glass particle deposit.

Still another object of the present invention is to provide an apparatus for the production of a porous optical fiber preform which prevents the flames carrying the fine particles of glass from the burners from flickering and thereby prevents fluctuations in the quality of the fine glass particle deposit (porous optical fiber preform) in the longitudinal direction.

Still another object of the present invention is to provide an apparatus for the production of a porous optical fiber preform which enables fine particles of glass emitted from the burners to efficiently deposit on the seed rod and thereby efficiently form a fine glass particle deposit (porous optical fiber preform).

Still another object of the present invention is to provide a method for production of the above porous optical fiber preform.

According to a first aspect of the present invention, there is provided an apparatus for the production of a porous optical fiber preform having a core portion and a cladding portion formed at the circumference of the core portion, the apparatus for the production of a porous optical fiber preform provided with a reaction vessel having a reaction portion, a feed port for introducing a stream of gas into the reaction portion, and a main exhaust port, facing the feed port in a horizontal direction across the reaction portion, for exhausting the gas from the reaction portion; a rotating means, introduced into the reaction portion, for mounting, rotating, and pulling up a seed rod for forming the porous optical fiber preform; a first burner, introduced into the reaction portion, for emitting a flame carrying fine particles of glass forming the core portion in the horizontal direction or upward toward the seed rod mounted to the rotating means or the porous optical fiber preform deposited on the seed rod; a second burner, introduced into the reaction portion, for emitting a flame carrying fine particles of glass forming the cladding portion in the horizontal direction or upward on to the core portion of the porous optical fiber preform deposited on the seed rod mounted at the rotating means; and a flow adjusting means for adjusting the flow of the stream of gas from the feed port to the main exhaust port so that the flames carrying the glass particles emitted from the first and second burners to be deposited on the seed rod are not disturbed by the stream of gas and so that the stream of gas does not directly contact a fine glass particle deposit formed at a bottom end of the seed rod.

Preferably, the reaction vessel further has a secondary exhaust port, positioned between a portion forming the porous optical fiber preform in the reaction portion and the main exhaust port, for exhausting the gas behind the porous optical fiber preform to the outside.

Alternatively or more preferably, the flow adjusting means adjusts the flow of the stream of gas so as to be higher than a bottom end area of the porous optical fiber preform at which the fine particles of glass emitted from the first and second burners are deposited on the seed rod.

Still more preferably, the flow adjusting means includes a baffle plate provided at the feed port so as to partially block the lower part of the feed port and make the stream of gas flow higher than a bottom end area of the porous optical fiber preform at which the fine particles of glass emitted from the first and second burners are deposited on the seed rod.

Even more preferably, the flow adjusting means further has a guide rail for making the baffle plate move up and down in a vertical direction in the feed port.

In the first aspect, again alternatively or more preferably, the flow adjusting means includes two baffle plates arranged at a center of two feed ports provided together so as to make the stream of gas flow along side walls of the reaction portion in the horizontal direction and not flow to the positions of provision of the first and second burners.

Here, still more preferably, the flow adjusting means further has guide rails for making the two baffle plates move in a horizontal direction at the feed ports.

In the first aspect, again alternatively or more preferably, the flow adjusting means includes a baffle plate with a width in the horizontal direction larger than a diameter of the porous optical fiber preform to be formed on the seed rod.

Here, still more preferably, the flow adjusting means is formed with a hole through which the second burner passes and the second burner is arranged to pass through the hole of the flow adjusting means and emit the flame carrying the fine particles of glass forming the cladding portion upward on to the fine particles of glass forming the core portion deposited on the seed rod.

Here, even more preferably, the baffle plate is flat.

Here, alternatively even more preferably, the baffle plate is shaped bent in the horizontal direction and flat in the vertical direction.

In the latter case, more preferably the baffle plate is provided with a plurality of small holes arranged in the vertical direction near the two ends in the horizontal direction.

According to a second aspect of the present invention, there is provided a method for the production of a porous optical fiber preform having a core portion and a cladding portion formed at the circumference of the core portion, the method for the production of a porous optical fiber preform comprising adjusting the flow of a stream of gas from a feed port through a reaction vessel toward a main exhaust port so that a first flame carrying fine particles of glass forming the core portion and a second flame carrying fine particles of glass forming the cladding portion are not disturbed by the stream of gas.

Preferably, the method further comprises adjusting the flow of the stream of gas so as to be higher than a bottom end area of the porous optical fiber preform deposited on the seed rod.

More preferably, the method further comprises partially blocking the lower part of the feed port and making the stream of gas flow higher than a bottom end area of the porous optical fiber preform deposited on the seed rod.

Still more preferably, the method further comprises making the stream of gas flow along side walls of the reaction portion in the horizontal direction so as not to disturb the first and second flames carrying the fine particles of glass.

That is, in the present invention, the flow adjusting means prevents the horizontal stream of gas flowing from the feed port to the main exhaust port from disturbing the shapes of the flames carrying the fine particles of glass and contacting the fine glass particle deposit. As a result, it is possible to prevent the surface temperature of the fine glass particle deposit from falling and cracks from forming in the fine glass particle deposit. Further, it is possible to prevent the flames carrying the fine particles of glass from the burners from flickering and therefore prevent fluctuations in the quality of the fine glass particle deposit (porous optical fiber preform) in the longitudinal direction.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Preferred embodiments of the apparatus and method for production of a porous optical fiber preform of the present invention will be explained in detail next with reference to the drawings.

First Embodiment

Figure 1:
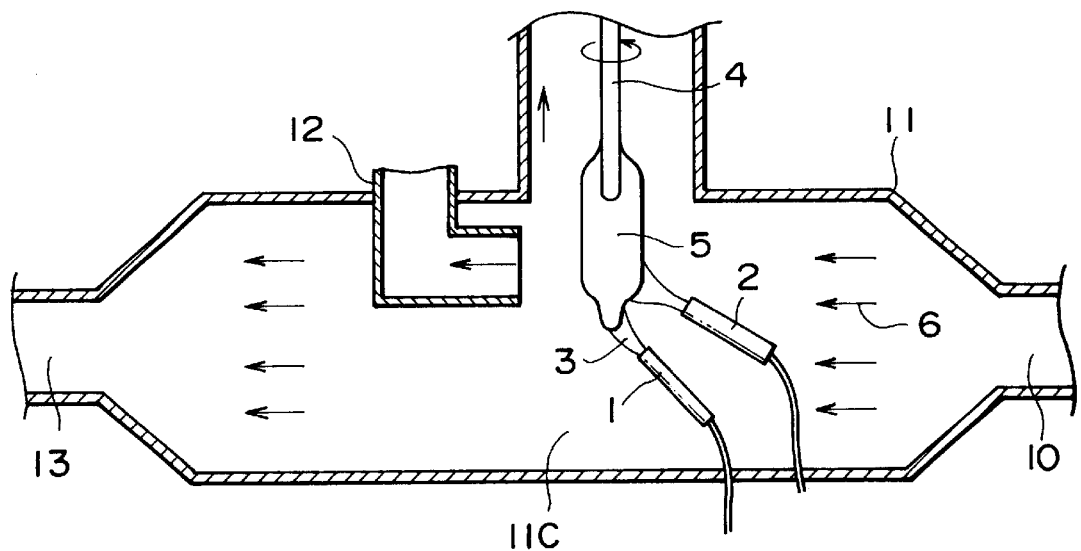
FIG. 1 is a sectional view of an apparatus for the production of a porous optical fiber preform of the related art.
Figure 2A:
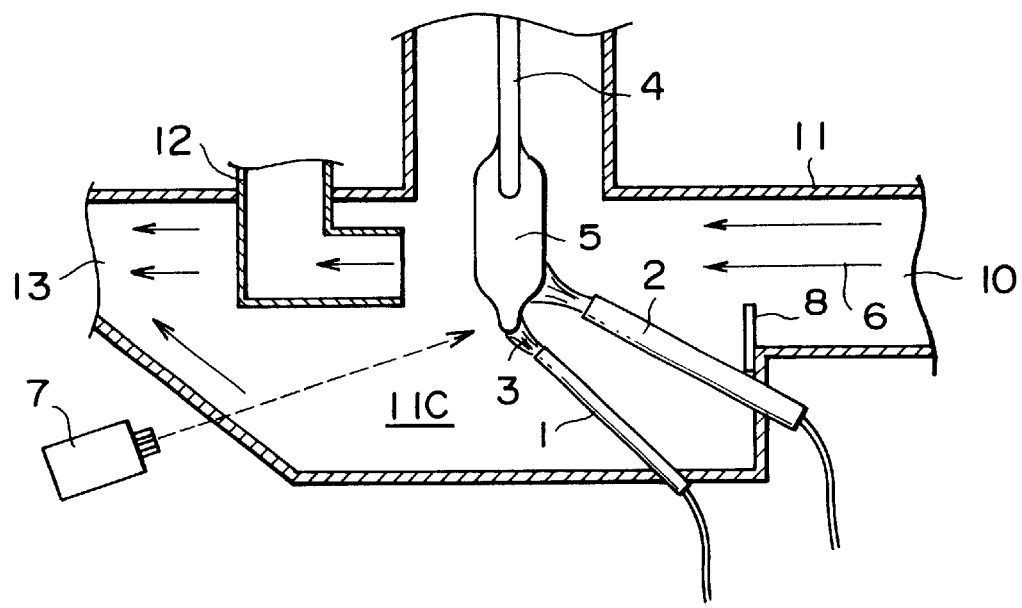
FIGS. 2A and 2B are a sectional view and an enlarged partial sectional perspective view an apparatus for the production of a porous optical fiber preform according to a first embodiment of the present invention.
Figure 2B:
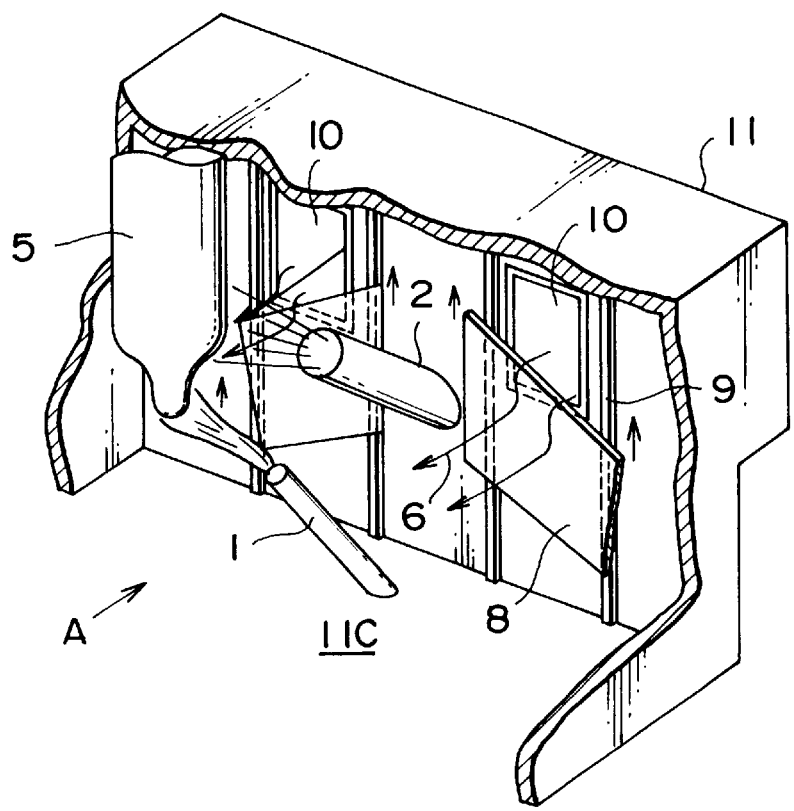

FIGS. 2A and 2B are a sectional view and an enlarged partial sectional perspective view of an apparatus for production of a porous optical fiber preform according to an embodiment of the present invention. FIGS. 2A and 2B assign the same reference numerals to portions the same as portions explained with reference to FIG. 1 used in the explanation of the related art.

Referring to FIG. 1 and FIG. 2A, the apparatus for production of a porous optical fiber preform of this embodiment of the present invention is provided with a reaction vessel 11, a core forming multitube burner 1 and a cladding forming multitube burner 2 arranged inside a reaction portion 11C positioned at the center of the reaction vessel 11, feed ports 10 for introducing a stream of inert gas to the reaction portion 11C of the reaction vessel 11, a main exhaust port 13, and a secondary exhaust port 12 positioned behind the fine glass particle deposit 5.

In the reaction portion 11C, the multitube burners 1 and 2 emit oxyhydrogen flames 3. By charging silicon tetrachloride gas into the multitube burners, fine particles of glass of silicon dioxide are produced by a flame hydrolysis reaction. As a result, a fine glass particle deposit 5 is formed at the bottom end of the seed rod 4. The seed rod 4 is rotated and pulled up as the fine glass particle deposit 5 is formed at its bottom end. As a result, a fine glass particle deposit 5 is grown in the longitudinal direction of the seed rod 4 and the porous optical fiber preform is formed. This method of production of a porous optical fiber preform is called the VAD method.

The stream of inert gas 6, for example, argon gas, is introduced in an ordinary temperature state from the feed ports 10 to the reaction portion 11C and heads toward the main exhaust port 13 and the secondary exhaust port 12. The stream of inert gas 6 is a horizontal stream of gas which is substantially horizontal to the plane formed by the axis of rotation of the seed rod 4 and the axes of the burners 1 and 2 (paper surface) and substantially perpendicular to the axis of rotation of the seed rod 4.

A thermal viewer 7 measures the surface temperature of the fine glass particle deposit 5 by a noncontact method.

Two feed ports 10 are provided in a line (horizontal direction, that is, direction perpendicular to paper surface) so as to be positioned at the two sides of the burners 1 and 2.

The majority of the excess fine particles of glass not contributing to the formation of the fine glass particle deposit 5 is exhausted from the secondary exhaust port 12 to outside the reaction vessel 11. The main exhaust port 13 is provided to promote the exhaust. That is, the main exhaust port 13 is positioned behind the seed rod 4 when seen from the feed ports 10 and exhausts the excess part of the fine particles of glass not contributing to the formation of the fine glass particle deposit 5 and the stream of gas 6 to the outside of the reaction portion 11.

In the apparatus for production of a porous optical fiber preform of the first embodiment illustrated in FIGS. 2A and 2B, baffle plates 8 are provided in front of the two aligned feed ports 10 so as to adjust the flow of the horizontal stream of gas 6. That is, the baffle plates 8 adjust the flow of the horizontal stream of gas 6 so that the horizontal stream of gas 6 does not contact the fine glass particle deposit 5 being formed at the bottom end of the seed rod 4 and lower the surface temperature of the fine glass particle deposit 5 being formed and so that the horizontal stream of gas 6 does not to change the shapes of the flames containing fine particles of glass emitted from the core forming multitube burner 1 and the cladding forming multitube burner 2.

Figure 3A:
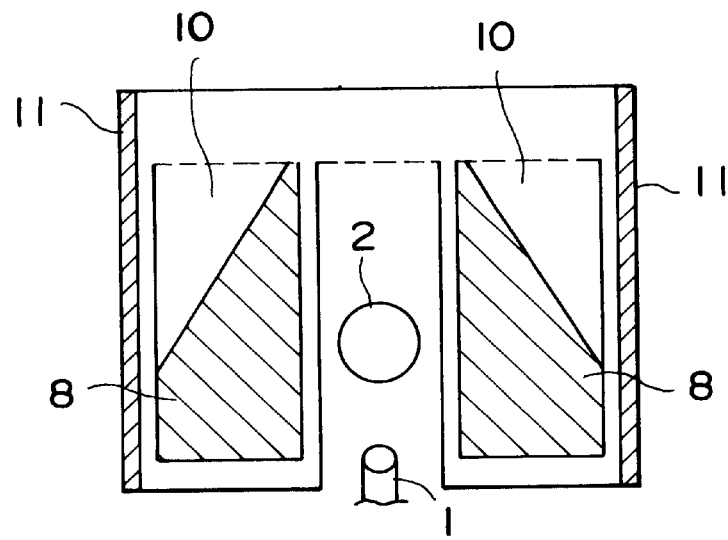
FIGS. 3A and 3B are sectional views seen from the direction A of FIG. 2B showing positions of a core forming multitube burner, cladding forming multitube burner, and baffle plates arranged in the reaction vessel.

FIG. 3A is a sectional view seen from the direction A of FIG. 2B showing positions of the core forming multitube burner 1, cladding forming multitube burner 2, and baffle plates 8 arranged in the reaction vessel 11.

Note that the top ends of the baffle plates 8 of the first embodiment illustrated in FIG. 2B and FIG. 3A are inclined to be higher at the sides closer to the center of the reaction vessel 11. As a result, the horizontal stream of gas 6 does not contact the fine glass particle deposit 5 being formed at the bottom end of the seed rod 4 and flows toward the fine glass particle deposit 5 at the top part already formed. Of course, the horizontal stream of gas 6 flows to portions not having a direct effect on the shapes of the flames containing fine particles of glass from the core forming multitube burner 1 and the cladding forming multitube burner 2.

The baffle plates 8 are provided to be able to be adjusted vertically in position in the reaction vessel 11 along guide rails 9. As a result, it is possible to adjust the flow of the horizontal stream of gas 6 in the vertical direction.

The lateral width of the baffle plates 8 is in the present embodiment made a size by which the horizontal stream of gas 6 flows while avoiding the burners 1 and 2 and the flames carrying fine particles of glass from the burners 1 and 2.

Note that due to limitations in illustration, the guide rails 9 are not illustrated in FIG. 2A.

In the first embodiment, it is possible to block the bottom ends of the feed ports 10 by the baffle plates 8 illustrated in FIG. 3A so as to adjust the flow of the horizontal stream of gas 6 from the feed ports 10. That is, the flow of the horizontal stream of gas 6 in the reaction vessel 10 is adjusted by the baffle plates 8 so that the horizontal stream of gas 6 is mainly at the upper part of the reaction vessel 11 and becomes weaker the further downward the side walls of the reaction vessel 11. In the horizontal direction perpendicular to the direction of the horizontal stream of gas 6, the horizontal stream of gas 6 becomes weakest at the center of the reaction vessel 11 (between the two feed ports 10).

Therefore, before forming the fine glass particle deposit 5, by using a gas flow meter and adjusting the position of the baffle plates 8 in the vertical direction along the guide rails 9 so that the horizontal stream of gas 6 does not strike the burners 1 and 2 and the area where the fine glass particle deposit 5 is formed, it is possible to make the horizontal stream of gas 6 not strike the area where the fine glass particle deposit 5 is being formed at the center of the reaction vessel 11 or below it much at all and to make it flow over a broad area of the vertical direction at the two sides of the area where the fine glass particle deposit 5 is positioned (walls of the reaction vessel 11). That is, the flow of the horizontal stream of gas 6 is adjusted by the baffle plates 8 so that the excess fine particles of glass are exhausted from the main exhaust port 13 the secondary exhaust port 12 and so as not to obstruct the flow of the flames carrying the fine particles of glass from the burners 1 and 2 toward the fine glass particle deposit 5.

By doing this, there is no longer the problem of the fine particles of glass emitted from the burners 1 and 2 toward the fine glass particle deposit 5 being sucked into the horizontal stream of gas 6 and excessively exhausted from the main exhaust port 13 and secondary exhaust port 12 and therefore it is possible to enhance the effect of deposition of the fine glass particle deposit 5.

In the first embodiment, as an experiment, air was made to flow at an average flow rate of 0.1 m/min as the horizontal stream of gas 6. It was found to be possible to prevent the horizontal stream of gas 6 from directly striking the fine glass particle deposit 5 or weaken it and to increase the density of the fine glass particle deposit 5 by 20 percent. As a result, it was possible to reduce the rate of occurrence of cracks in the fine glass particle deposit 5. Further, it was possible to stabilize the quality of the porous optical fiber preform formed in the longitudinal direction and to reduce variations in the cutoff wavelength of the optical fiber drawn from it as well.

As explained above, when forming a fine glass particle deposit by the VAD method, the soot growth rate, that is, the distance by which the seed rod (deposit of fine particles of glass) is pulled up per unit time, must be made constant in order to prevent fluctuations in the cutoff wavelength, to obtain a uniform shape of the fine glass particle deposit, etc. According to this embodiment of the present invention, the baffle plates 8 enable the flames to be kept steady without flickering and the rate of growth of the fine glass particle deposit to become stable. As a result, the distribution of the dopant for raising the refractive index of the core portion, for example, the germanium, in the longitudinal direction of the fine glass particle deposit becomes constant so the final optical fiber ends up with less variations in characteristics.

On the other hand, single mode optical fibers are suited for long distance transmission and are in wide use. The cutoff wavelength, however, must be kept from deviating or else use as a single mode optical fiber is not possible. Therefore, it is important that there be no variation in the cutoff wavelength of the optical fiber finally drawn and produced over its entire length.

Figure 3B:
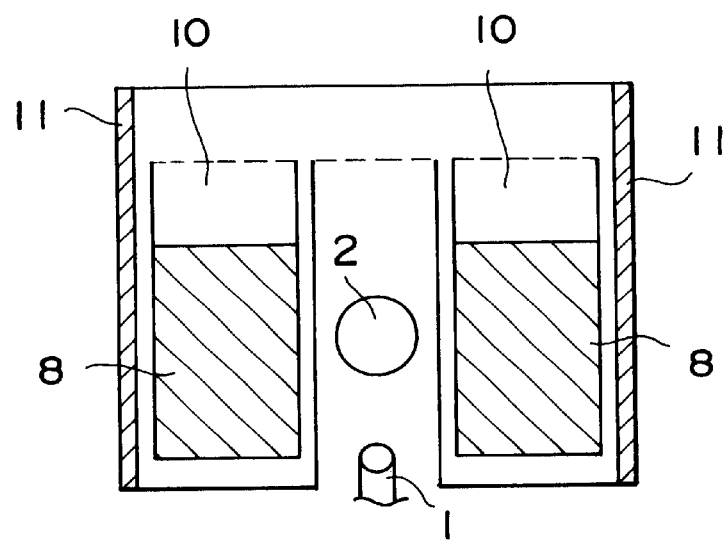

In the first embodiment illustrated in FIG. 3A, the top ends of the baffle plates 8 were inclined to be higher toward the center of the reaction vessel 11, but the baffle plates 8 may also be kept horizontal as illustrated in FIG. 3B.

FIG. 3B, in the same way as FIG. 3A, is a sectional view seen from the direction A of FIG. 2B showing positions of the core forming multitube burner 1, cladding forming multitube burner 2, and baffle plates 8 arranged in the reaction vessel 11. The configuration shown in Fig, 3B is similar to that of FIG. 3A except for the difference in the structure of the baffle plates 8 from FIG. 3A.

Second Embodiment

Figure 4:
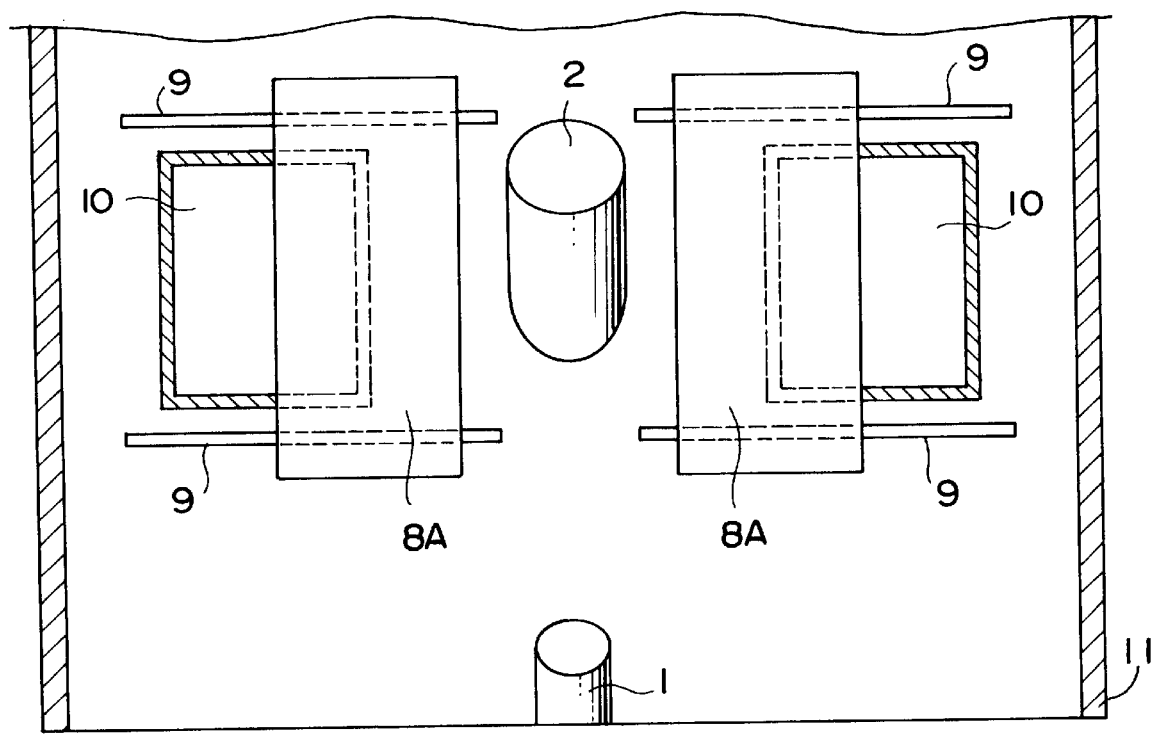
FIG. 4 is a partial sectional view of a second embodiment of the present invention.

The second embodiment, as shown in FIG. 4, provides baffle plates 8 with horizontal top ends inside the reaction vessel 11 shown in the first embodiment in a manner whereby they can be adjusted in position in the horizontal direction along guide rails 9.

FIG. 4 is a partial sectional view of the inside of the reaction vessel 11 showing the two feed ports 10 from the burner 1 and 2 side. Two baffle plates 8 are provided corresponding to the two feed ports 10 in a manner whereby they can be moved in the horizontal direction in the reaction vessel 11 along the guide rails 9. That is, in the first embodiment, the baffle plates 8 were arranged to be movable in the reaction vessel 11 in the vertical direction, but in the second embodiment, they are arranged to be movable in the horizontal direction. The horizontal stream of gas 6 is perpendicular to the paper surface.

In the second embodiment, the baffle plates 8 block the burner 1 and 2 sides (center part of reaction vessel 11) of the two feed ports 10 so as to make the horizontal stream of gas 6 flow over a broad area in the vertical direction near the walls of the reaction vessel 11 and not strike the fine glass particle deposit 5 (not shown).

The effect of the second embodiment is substantially the same as the effect of the first embodiment explained above.

Third Embodiment

Figure 5:
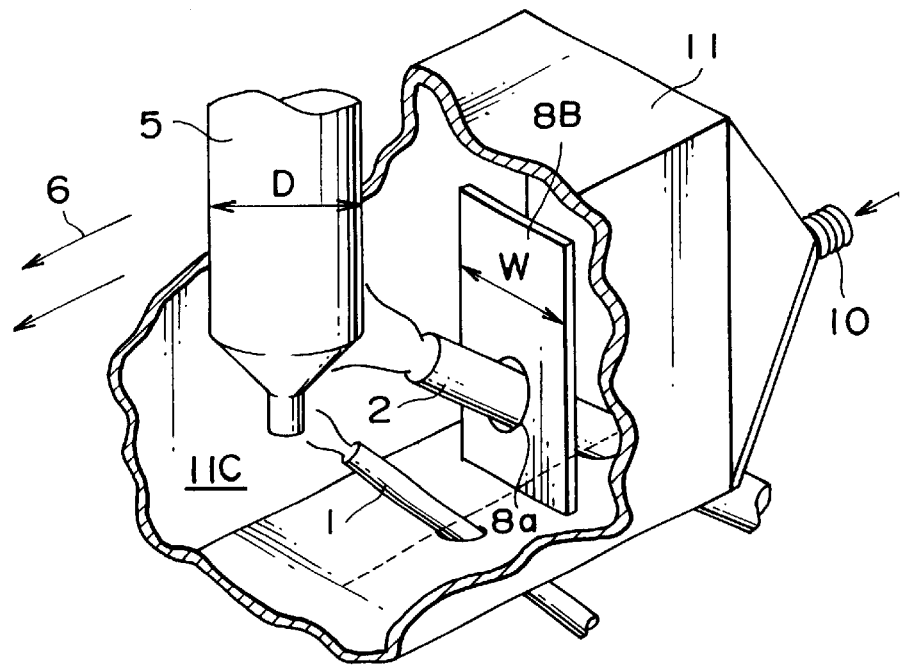
FIG. 5 is a partial sectional view of a third embodiment of the present invention.

The third embodiment, as shown in FIG. 5, provides a single feed port 10 in the reaction vessel 11 and provides a single longitudinally extended baffle plate 8B between the feed port 10 and the burners 1 and 2 so as to block the feed port 10.

The baffle plate 8B is a flat plate and has a width W larger than the diameter D of the fine glass particle deposit 5. In this example, the width W of the baffle plate 8B is 1.1 times the diameter D of the fine glass particle deposit 5. A hole 8a is provided through which the cladding forming multitube burner 2 passes. Note that the space between the burner 2 and the hole 8a is sealed with silicone rubber etc.

Note that the optical fiber obtained by drawing the porous optical fiber preform produced by the apparatus for production of a porous optical fiber preform of the third embodiment is reduced 30 percent in variation of the cutoff frequency (standard deviation) compared with the case where the width W of the baffle plate 8B is 0.9 time the diameter D of the fine glass particle deposit 5.

Specifically, a standard deviation of the cutoff wavelength in the case of W=0.9D was 23 nm, but became 17 nm in the case of W=1.1D.

Therefore, by suitably selecting the dimensions of the baffle plate 8B so that the width W of the baffle plate 8B becomes larger than the diameter D of the fine glass particle deposit 5 (W≧D), it is possible to improve the quality of the porous optical fiber preform and in turn the quality of the final product, that is, the optical fiber.

Fourth Embodiment

Figure 6:
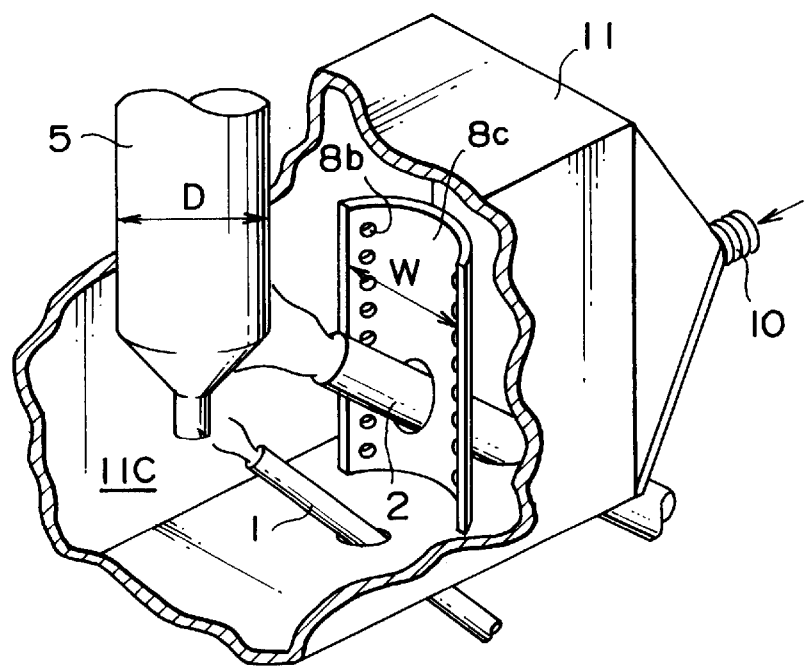
FIG. 6 is a partial sectional view of a fourth embodiment of the present invention.

The fourth embodiment, as shown in FIG. 6, changes the shape of the baffle plate 8B in the third embodiment. That is, the baffle plate 9C is bent in the horizontal direction. The width W is considerably larger than the diameter D of the fine glass particle deposit 5. For example, it is 2 times the diameter D of the fine glass particle deposit 5 (W=2D). Further, a plurality of small holes 8b are. provided aligned in the vertical direction at the two ends of the baffle plate 8C.

In the fourth embodiment, since the baffle plate 8C is bent and small holes 8b are provided at its two ends, the disturbance or swirling of the horizontal stream of gas 6 at the two ends of the baffle plate 8C is reduced. As a result, the variation (standard deviation) of the cutoff wavelength of the optical fiber obtained by drawing the preform is further reduced 40 percent compared with the third embodiment.

Specifically, compared with the 17 nm standard deviation of the cutoff wavelength at a W=1.1D in the case of the third embodiment, the standard deviation of the cutoff wavelength is further reduced 40 percent to 10 nm at a W=2D in the case of the fourth embodiment.

As explained above, according to the present invention, by providing the flow adjusting means, there is the advantageous effect that it is possible to prevent cracks in the porous optical fiber preform and possible to stabilize the quality of the porous optical fiber preform in the longitudinal direction.

By using such a porous optical fiber preform to produce an optical fiber, the quality of the final product is remarkably improved.

While the invention has been described with reference to specific embodiment chosen for purpose of illustration, it should be apparent that numerous modifications could be made thereto by those skilled in the art without departing from the basic concept and scope of the invention.

What is claimed is:

1. An apparatus for the production of a porous optical fiber preform having a core portion and a cladding portion formed at the circumference of the core portion, said apparatus for the production of a porous optical fiber preform comprising:

a reaction vessel having a reaction portion, a feed port for introducing a stream of gas into said reaction portion, and a main exhaust port, facing the feed port in a horizontal direction across the reaction portion, for exhausting the gas from the reaction portion;

a rotating means, introduced into the reaction portion, for mounting, rotating, and pulling up a seed rod for forming the porous optical fiber preform;

a first burner, introduced into the reaction portion and provided at a fixed position, for emitting a flame carrying fine particles of glass forming the core portion in the horizontal direction or upward toward the seed rod mounted to the rotating means or the porous optical fiber preform deposited on the seed rod;

a second burner, introduced into the reaction portion and provided at a fixed position, for emitting a flame carrying fine particles of glass forming the cladding portion in the horizontal direction or upward on to the core portion of the porous optical fiber deposited on the seed rod mounted at the rotating means; and a flow adjusting means for adjusting the direction of the flow of the stream of gas flowing in a horizontal direction from the feed port to the main exhaust port so that the flames carrying the glass particles emitted from the first and second burners to be deposited on the seed rod are not disturbed by the stream of gas and so that the stream of gas does not directly contact a fine glass particle deposit formed at a bottom end of the seed rod.

2. An apparatus for the production of a porous optical fiber preform as set forth in claim 1, wherein the reaction vessel further has a secondary exhaust port, positioned between a portion forming the porous optical fiber preform in the reaction portion and the main exhaust port, for exhausting the gas behind the porous optical fiber preform to the outside.

3. An apparatus for the production of a porous optical fiber preform as set forth in claim 1, wherein the flow adjusting means adjusts the direction of the flow of the stream of gas so as to be higher than a bottom end area of the porous optical fiber preform at which the fine particles of glass emitted from the first and second burners are deposited on the seed rod.

4. An apparatus for the production of a porous optical fiber preform as set forth in claim 3, wherein the flow adjusting means includes a baffle plate provided at the feed port so as to partially block the lower part of the feed port and make the stream of gas flow higher than a bottom end area of the porous optical fiber preform at which the fine particles of glass emitted from the first and second burners are deposited on the seed rod.

5. An apparatus for the production of a porous optical fiber preform having a core portion and a cladding portion formed at the circumference of the core portion, said apparatus for the production of a porous optical fiber preform comprising:

a reaction vessel having a reaction portion, a feed port for introducing a stream of gas into said reaction portion, and a main exhaust port, facing the feed port in a horizontal direction across the reaction portion, for exhausting the gas from the reaction portion;

a rotating means, introduced into the reaction portion, for mounting, rotating, and pulling up a seed rod for forming the porous optical fiber preform;

a first burner, introduced into the reaction portion, for emitting a flame carrying fine particles of glass forming the core portion in the horizontal direction or upward toward the seed rod mounted to the rotating means or the porous optical fiber preform deposited on the seed rod;

a second burner, introduced into the reaction portion, for emitting a flame carrying fine particles of glass forming the cladding portion in the horizontal direction or upward on to the core portion of the porous optical fiber preform deposited on the seed rod mounted at the rotating means; and a flow adjusting means for adjusting the flow of the stream of gas from the feed port to the main exhaust port so that the flames carrying the glass particles emitted from the first and second burners to be deposited on the seed rod are not disturbed by the stream of gas and so that the stream of gas does not directly contact a fine glass particle deposit formed at a bottom end of the seed rod, wherein the flow adjusting means adjusts the flow of the stream of gas so as to be higher than a bottom end area of the porous optical fiber preform at which the fine particles of glass emitted from the first and second burners are deposited on the seed rod, and wherein the flow adjusting means includes a baffle plate provided at the feed port so as to partially block the lower part of the feed port and make the stream of gas flow higher than a bottom end area of the porous optical fiber preform at which the fine particles of glass emitted from the first and second burners are deposited on the seed rod, and wherein the flow adjusting means further has a guide rail for making the baffle plate move up and down in a vertical direction in the feed port.

6. An apparatus for the production of a porous optical fiber preform as set forth in claim 3, wherein the flow adjusting means includes two baffle plates arranged at a center of two feed ports provided together so as to make the stream of gas flow along side walls of the reaction portion in the horizontal direction and not flow to the positions of provision of the first and second burners.

7. An apparatus for the production of a porous optical fiber preform having a core portion and a cladding portion formed at the circumference of the core portion, said apparatus for the production of a porous optical fiber preform comprising:

a reaction vessel having a reaction portion, a feed port for introducing a stream of gas into said reaction portion, and a main exhaust port, facing the feed port in a horizontal direction across the reaction portion, for exhausting the gas from the reaction portion;

a rotating means, introduced into the reaction portion, for mounting, rotating, and pulling up a seed rod for forming the porous optical fiber preform;

a first burner, introduced into the reaction portion, for emitting a flame carrying fine particles of glass forming the core portion in the horizontal direction or upward toward the seed rod mounted to the rotating means or the porous optical fiber preform deposited on the seed rod;

a second burner, introduced into the reaction portion, for emitting a flame carrying fine particles of glass forming the cladding portion in the horizontal direction or upward on to the core portion of the porous optical fiber preform deposited on the seed rod mounted at the rotating means; and a flow adjusting means for adjusting the flow of the stream of gas from the feed port to the main exhaust port so that the flames carrying the glass particles emitted from the first and second burners to be deposited on the seed rod are not disturbed by the stream of gas and so that the stream of gas does not directly contact a fine glass particle deposit formed at a bottom end of the seed rod, wherein the flow adjusting means adjusts the flow of the stream of gas so as to be higher than a bottom end area of the porous optical fiber preform at which the fine particles of glass emitted from the first and second burners are deposited on the seed rod, and wherein the flow adjusting means includes two baffle plates arranged at a center of two feed ports provided together so as to make the stream of gas flow along side walls of the reaction portion in the horizontal direction and not flow to the positions of provision of the first and second burners, and wherein the flow adjusting means further has guide rails for making the two baffle plates move in a horizontal direction at the feed ports.

8. An apparatus for the production of a porous optical fiber preform as set forth in claim 3, wherein the flow adjusting means includes a baffle plate with a width in the horizontal direction larger than a diameter of the porous optical fiber preform to be formed on the seed rod.

9. An apparatus for the production of a porous optical fiber preform as set forth in claim 8, wherein the flow adjusting means is formed with a hole through which said second burner passes and the second burner is arranged to pass through the hole of the flow adjusting means and emit the flame carrying the fine particles of glass forming the cladding portion upward on to the fine particles of glass forming the core portion deposited on the seed rod.

10. An apparatus for the production of a porous optical fiber preform as set forth in claim 9, wherein the baffle plate is flat.

11. An apparatus for the production of a porous optical fiber preform as set forth in claim 9, wherein the baffle plate is shaped bent in the horizontal direction and flat in the vertical direction.

12. An apparatus for the production of a porous optical fiber preform as set forth in claim 11, wherein the baffle plate is provided with a plurality of small holes arranged in the vertical direction near the two ends in the horizontal direction.

\* \* \* \* \*